US008388165B2

(12) United States Patent
Zhang

(10) Patent No.: US 8,388,165 B2

(45) Date of Patent: Mar. 5, 2013

(54) DISPLAYING DEVICE AND METHOD THEREOF

(76) Inventor: Yudong Zhang, Lake Mary, FL (US)

( * ) Notice: Subject to any disclaimer, the term of this patent is extended or adjusted under 35 U.S.C. 154(b) by 277 days.

(21) Appl. No.: 12/218,479

(22) Filed: Jul. 15, 2008

(65) Prior Publication Data

US 2010/0011637 A1 Jan. 21, 2010

(51) Int. Cl.
*G02F 1/1335* (2006.01)

(52) U.S. Cl. ............ 362/116; 349/16; 40/448; 174/521; 446/147; 264/34; 264/496

(58) Field of Classification Search .................. 362/116; 349/16; 40/442, 446, 448, 661.9, 489; 446/147; 174/521; 264/34, 496
See application file for complete search history.

(56) References Cited

U.S. PATENT DOCUMENTS

| | | | | | |
|---|---|---|---|---|---|
| 1,360,575 | A | * | 11/1920 | Pinto | 40/555 |
| 1,660,025 | A | * | 2/1928 | Allen, Jr. | 174/50.53 |
| 2,136,609 | A | * | 11/1938 | Butterfield et al. | 361/301.1 |
| 2,166,864 | A | * | 7/1939 | Gelardin | 40/555 |
| 2,761,077 | A | * | 8/1956 | Harris | 310/26 |
| 2,862,992 | A | * | 12/1958 | Franz | 174/520 |
| 2,882,504 | A | * | 4/1959 | Hultgren | 336/96 |
| 2,883,592 | A | * | 4/1959 | Burton et al. | 257/785 |
| 3,922,842 | A | * | 12/1975 | Fujita | 368/30 |
| 4,081,952 | A | * | 4/1978 | Busch et al. | 368/82 |
| 4,142,287 | A | * | 3/1979 | Grabbe | 29/827 |
| 4,514,920 | A | * | 5/1985 | Shafrir et al. | 40/448 |
| 4,893,903 | A | * | 1/1990 | Thakar et al. | 349/1 |
| 5,153,760 | A | * | 10/1992 | Ahmed | 349/116 |
| 5,226,220 | A | * | 7/1993 | Gevas et al. | 29/605 |
| 5,244,840 | A | * | 9/1993 | Kodai et al. | 29/841 |
| 5,339,548 | A | * | 8/1994 | Russell | 40/324 |
| 5,461,815 | A | * | 10/1995 | Rodgers | 43/17.6 |
| 5,548,163 | A | * | 8/1996 | French | 307/10.2 |
| 5,604,688 | A | * | 2/1997 | Chu et al. | 708/160 |
| 5,622,422 | A | * | 4/1997 | Rodgers | 362/158 |
| 5,927,240 | A | * | 7/1999 | Maxon | 123/179.3 |
| 5,940,150 | A | * | 8/1999 | Faris et al. | 349/16 |
| 6,089,728 | A | * | 7/2000 | Weinstein | 362/116 |
| 6,141,067 | A | * | 10/2000 | Ikka | 349/65 |
| 6,248,021 | B1 | * | 6/2001 | Ognjanovic | 473/131 |
| 6,351,903 | B1 | * | 3/2002 | Tuomi | 40/634 |
| 6,556,337 | B1 | * | 4/2003 | Wright | 359/245 |
| 7,094,074 | B2 | * | 8/2006 | Chiou et al. | 439/79 |
| 7,652,892 | B2 | * | 1/2010 | Shiu et al. | 361/752 |
| 7,857,225 | B2 | * | 12/2010 | Challa et al. | 235/462.45 |
| 2002/0114130 | A1 | * | 8/2002 | Schremmer et al. | 361/683 |
| 2004/0032734 | A1 | * | 2/2004 | Chen | 362/189 |
| 2004/0204240 | A1 | * | 10/2004 | Barney | 463/36 |
| 2007/0206365 | A1 | * | 9/2007 | Shiu et al. | 361/752 |
| 2008/0151134 | A1 | * | 6/2008 | Huang | 349/25 |
| 2009/0009667 | A1 | * | 1/2009 | Dayan | 348/838 |
| 2010/0252622 | A1 | * | 10/2010 | Bedore | 235/380 |

* cited by examiner

*Primary Examiner* — Ismael Negron

(57) ABSTRACT

The device comprises a visual effecter and a display, wherein the visual effecter comprises at least one encapsulated electronic-optical element; the display can be a 2-dimensional or 3-dimensional display or any combination thereof; the display locates outside the visual effecter; and the display is subject to the visual effect of the visual effecter.

13 Claims, 4 Drawing Sheets

DISPLAYING DEVICE AND METHOD THEREOF

BACKGROUND OF THE INVENTION

The present invention is related to a displaying device and method thereof. It finds particular application in conjunction with a souvenir product such as a key chain, and will be described with particular reference thereto. However, it is to be appreciated that the present exemplary embodiment is also amenable to other like applications.

As customized products are becoming more and more popular, how to manufacture them in an easy, speedy, reliable and cost-effective way remains a problem to be solved. For example, a tourist may prefer to purchase a souvenir product (e.g. a key chain) with his or her name or portrait integrated in the souvenir, an example of which is a key chain with "John Smith" combined with text and/or image featuring Florida, Hollywood, the White House, the Niagara Fall, and the like. Many souvenir products include electronic and optical components that give a special visual effect, for example, "flashing" or "blinking" appearance of the name "John Smith". Currently, chemical encapsulation of the customized label ("John Smith") together with the electronic and optical components is necessary in manufacturing such a customized souvenir. However, the production process suffers many defects such as high failure rate, burdensome processing and handling, high cost, poor product stability, and slow or even failed supply of the product to soon-leaving tourists.

Advantageously, the present invention provides a displaying device such as a souvenir and method thereof, which exhibit numerous merits such as easy manufacturability, lower failure rate, improved cost-effectiveness, production efficiency, easy handling, speedy and timely supply, and better product reliability, among others.

BRIEF DESCRIPTION OF THE INVENTION

One aspect of the invention is to provide a displaying device comprising a visual effecter and a display. The visual effecter comprises at least one encapsulated electronic-optical element. The display may be any 2-dimensional display, 3-dimensional object, or any combination thereof. For example, when the display is a 2-dimensional display, it can comprise an image, a text, or any combination thereof. The display locates outside the visual effecter and is subject to the visual effect of the visual effecter.

Another aspect of the invention is to provide a method of making a displaying device comprising a visual effecter and a display. The method comprises:

(i) encapsulating at least one electronic-optical element;

(ii) providing a visual effecter comprising the at least one electronic-optical element;

(iii) providing a 2-dimensional or 3-dimensional display; and (iv) placing the display outside the visual effecter so as to make the display subject to the visual effect of the visual effecter.

DETAILED DESCRIPTION OF THE INVENTION

Figure 1:
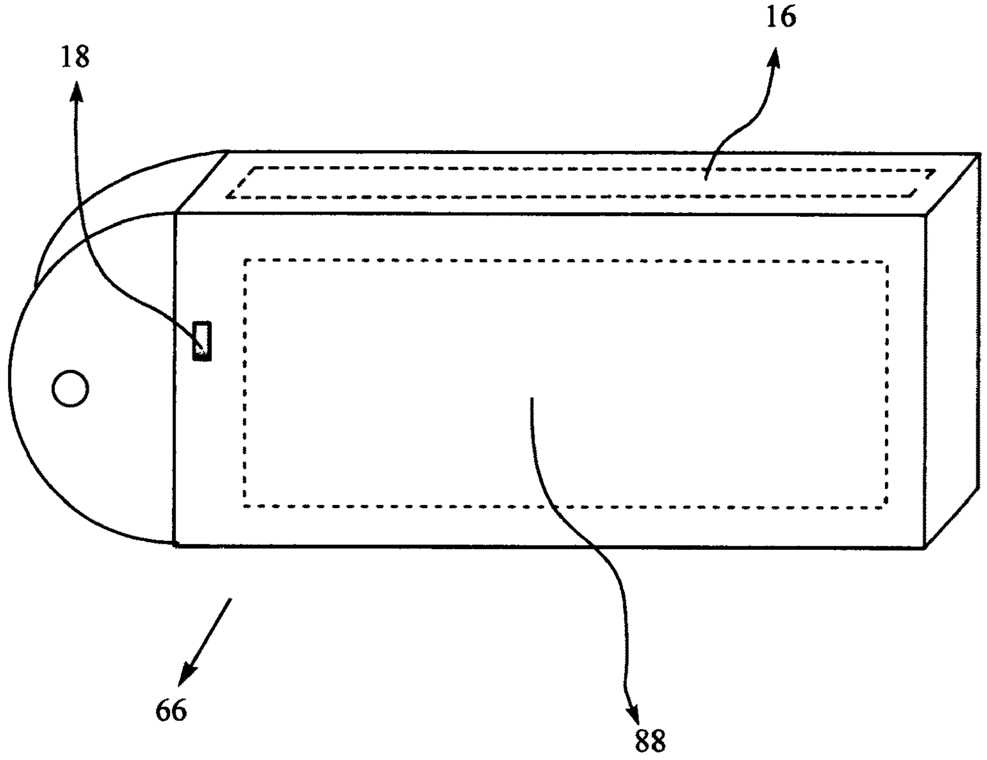
FIG. 1 schematically shows the configuration of an encapsulated visual effecter made for a souvenir such as a key chain in an embodiment of the invention.

In various preferred embodiments, the display is completely placed outside the visual effecter. In other words, the visual effecter contains no display at all that is intended to be subject to the visual effect of the visual effecter.

The electronic-optical element of the invention is defined as any structure driven by electrical energy that can manipulate photons, for example, produce or emit, transmit, partially or completely polarize, partially or completely absorb, variably absorb, block, variable block, attenuate, amplify, disperse, reflect, extract, interfere, and refract light (photons). Such manipulation of photons produces various visual effects when an observer perceives the display comprising an image, a text, or any combination thereof. The light under manipulation is typically in the visible spectrum. However, the light may also be in ranges of ultraviolet (e.g. 0.2-0.35 μm wavelength), near infra-red, long-wave infrared (e.g. 8-12 μm wavelength), and far-infrared spectrum (e.g., 75-150 μm wavelength), for example, when an observer is armed with an instrument and be able perceive the visual effect.

Some of the electronic-optical element of the invention may be selected from various known electro-optical devices and optoelectronic devices. Electro-optical devices operate by modification of the optical properties of a material by an electric field, based on the interaction between the electromagnetic (optical) and the electrical (electronic) states of materials. An example of optoelectronic device is a thin-film semiconductor device.

In various embodiments, examples of the electronic-optical element include, but are not limited to, a liquid crystal device such as a liquid crystal display (LCD), an electroluminescence (EL) device, a light emitting device such as a light emitting diode (LED), an organic light-emitting diode (OLED) and a polymer light-emitting diode (PLED); a laser, and the like.

In exemplary embodiments, the electronic-optical element may be selected from a thin film transistor liquid crystal display (TFT-LCD), a twisted nematic (TN) display, a high twisted nematic (HTN) display, a super-twisted nematic display (STN), a color super-twist nematic (CSTN) display, a double layer STN, a dual scan STN, a fast response STN (FRSTN), a film compensated STN or formulated STN or filtered STN (FSTN), a double film STN (FFSTN), a monochrome STN (MSTN), and the like, and any combination thereof.

Examples of EL material include, but are not limited to, powder zinc sulfide doped with copper or silver, thin film zinc sulfide doped with Manganese, natural blue diamond (diamond with boron as a dopant), III-V semiconductors such as InP, GaAs, and GaN, and inorganic semiconductors such as $[Ru(bpy)_3]^{2+}(PF_6^-)_2$ where bpy is 2,2'-bipyridine.

When used in the electronic-optical element of the invention, LEDs can be made from a variety of inorganic semiconductor materials to produce many different colors. For example, aluminium gallium arsenide (AlGaAs) gives red and infrared emissions; aluminium gallium phosphide (AlGaP) gives green emission; aluminium gallium indium phosphide (AlGaInP) gives high-brightness orange-red, orange, yellow, and green emissions; gallium arsenide phosphide (GaAsP) gives red, orange-red, orange, and yellow emissions; gallium phosphide (GaP) gives red, yellow and green emissions; gallium nitride (GaN) gives green, pure green (or emerald green), blue, and white (if it has an AlGaN Quantum Barrier) emission; and indium gallium nitride (InGaN) gives near ultraviolet, bluish-green and blue emissions; silicon (Si), silicon carbide (SiC), or sapphire (Al2O3) as substrate gives blue emission; Zinc selenide (ZnSe) gives blue emission; and Aluminium nitride (AlN), aluminium gallium nitride (AlGaN), aluminium gallium indium nitride (AlGaInN) give near to far ultraviolet emission. Various photoluminescence (PL) materials such as phosphors and phosphor blend may be used with LEDs to produce any desirable color of light emissions.

In specific embodiments, the electronic-optical element comprises any known twisted nematic (TN) display. A TN display typically contains liquid crystals which twist and untwist at varying degrees to allow light to pass through. When no voltage is applied to a TN liquid crystal cell, the light is polarized to pass through the cell. In proportion to the voltage applied, the LC cells twist up to 90 degrees changing the polarization and blocking the light's path. By properly adjusting the level of the voltage almost any grey level or transmission can be achieved.

For example, the invention may use any known TN display with the following specification: static driving mode, white/black display mode, transmissive polarizer mode, 6H viewing direction, 3.0V driving voltage, 1/1 duty, and 1/1 bias.

In various embodiments, the visual effecter of the invention further comprises an electronic element that is encapsulated with the electronic-optical element. Examples of electronic element include, but are not limited to, electronic components such as resistor, capacitor, transistor, and diode; and a circuit comprising one or more such electronic components. Two or more electronic components may be packaged in a discrete form with connecting leads or metallic pads. For example, electronic components may be connected together by e.g. soldering to a printed circuit board to create an electronic circuit with a particular function.

The electronic component may be an integrated circuit (also known as IC, microcircuit, microchip, silicon chip, or chip), for example, a monolithic IC. Such a miniaturized electronic circuit may be preferred for some visual effecters of the invention. A hybrid integrated circuit, HIC, or hybrid microcircuit may also be encapsulated and used in the visual effecters of the invention. A HIC is typically constructed of semiconductor devices (e.g. transistors and diodes) and passive components (e.g. resistors, inductors and capacitors), bonded to a substrate or printed circuit board (PCB).

In specific embodiments, the visual effecter of the invention further comprises a flashing IC that is encapsulated with the electronic-optical element such as a TN display. For example, the flashing IC may provide a square wave (e.g. 0.5 Hz) to drive the TN display to "flash" or "blink". A display such as customized label ("John Smith") may be located behind the TN display (but outside the visual effecter), and exhibits a "flashing" or "blinking" visual effect due to the optical function of TN display.

The device of the invention typically uses a power supply or an energy source to drive the electronic-optical element such as a TN display. The power supply can locate outside the visual effecter, and electrically connects to the visual effecter from outside, for example, a separate battery and a commercial AC power supply with 120V and 60 Hz. Alternatively, the device can be designed similar to a mobile phone, which comprises a rechargeable battery such as lithium-ion battery that can be recharged by a commercial AC power supply. Preferably, the rechargeable battery is also encapsulated with the electronic-optical element to form the visual effecter.

In preferred embodiments, the power supply is totally encapsulated with the electronic-optical element to form the visual effecter. In other words, the power supply is located inside the visual effecter and there is no electrical connection between any outside device and the visual effecter. A completely encapsulated visual effecter is preferred for advantages such as good electrical insulation e.g. prevention of current leakage; protection against moisture and water (waterproof), air, salt spray, and microorganism; and mechanical strength against shock and vibration.

The encapsulated power supply may be selected from a photovoltaic cell such as a solar cell, an electrochemical battery such as a lithium battery, and a mechanical power supply.

A photovoltaic cell can capture energy from any light source, whether man-made or natural light such as sunlight and moon light. A solar cell is a device that converts sunlight energy into electricity by the photovoltaic effect. Assemblies of cells can be used to make solar modules, which may in turn be linked in photovoltaic arrays or a solar panel. For example, a number of cells can be connected electrically and packaged in a photovoltaic module. Solar cells can also be connected in series in modules, creating an additive voltage. Connecting cells in parallel will yield a higher current. Modules can be interconnected, in series or parallel, or both, to create an array with the desired voltage and current.

The most commonly known solar cell is configured as a large-area p-n junction made from silicon. If a piece of p-type silicon is placed in intimate contact with a piece of n-type silicon, then a diffusion of electrons occurs from the region of high electron concentration (the n-type side of the junction) into the region of low electron concentration (p-type side of the junction). When the electrons diffuse across the p-n junction, they recombine with holes on the p-type side. The diffusion of carriers does not happen indefinitely however, because of an electric field which is created by the imbalance of charge immediately on either side of the junction which this diffusion creates. The electric field established across the p-n junction creates a diode that promotes current to flow in only one direction across the junction. Electrons may pass from the n-type side into the p-type side, and holes may pass from the p-type side to the n-type side, but not the other way around.

Typically, photons in sunlight hit a solar cell and are absorbed by e.g. semiconducting materials such as silicon. Electrons (negatively charged) are knocked loose from their atoms, allowing them to flow through the material to produce electricity. The complementary positive charges that are also created are called holes and flow in the direction opposite of the electrons in a silicon solar panel. An array of solar panels converts solar energy into a usable amount of direct current (DC) electricity.

Typically, ohmic metal-semiconductor contacts can be made to both the n-type and p-type sides of the solar cell, and the electrodes connected to an external load, for example, the electronic-optical element such as a TN display. Electrons that are created on the n-type side, or have been "collected" by the junction and swept onto the n-type side, may travel through the wire, power the load, and continue through the wire until they reach the p-type semiconductor-metal contact. Here, they recombine with a hole that was either created as an electron-hole pair on the p-type side of the solar cell, or swept across the junction from the n-type side after being created there.

The present invention can use any suitable commercial solar cells, for example, screen printed poly-crystalline silicon solar cells, and single crystalline silicon wafer solar cells. Poly-crystalline silicon wafers may be made by wire-sawing block-cast silicon ingots into very thin (180 to 350 micrometer) slices or wafers. The wafers are usually lightly p-type doped. To make a solar cell from the wafer, a surface diffusion of n-type dopants is performed on the front side of the wafer. This forms a p-n junction a few hundred nanometers below the surface.

The present invention can also use any suitable commercial organic solar cells and polymer solar cells which are built from thin films (typically 100 nm) of organic semiconductors such as polymers and small-molecule compounds like polyphenylene vinylene, copper phthalocyanine (a blue or green organic pigment) and carbon fullerenes. The active region of such an organic device consists of two materials, one which acts as an electron donor and the other as an acceptor. When a photon is converted into an electron hole pair, typically in the donor material, the charges tend to remain bound in the form of an exciton, and are separated when the exciton diffuses to the donor-acceptor interface.

The power supply of the invention may also be an electrochemical battery. A battery may contain two or more electrochemical cells which store chemical energy and make it available to convert to electrical energy. Examples of electrochemical cell include galvanic cells, electrolytic cells, fuel cells, flow cells and voltaic pile etc.

In some embodiments, the invention may use any known small-size battery such as a lithium battery, a watch battery, a button cell, a silver button cell, or a coin cell, although other kinds of batteries may also be considered, for example, one or more alkaline batteries.

The present invention may also utilize a mechanical power supply that converts mechanical energy to electrical energy, generally using electromagnetic induction. Preferably, the source of mechanical energy is the mechanical movement of the device according to the present invention, similar to a mechanically powered flashlight. The invention can incorporate the structure of a Faraday flashlight. A Faraday flashlight contains a super capacitor and charging mechanism that uses induction to power a high-intensity white LED array. Simply shaking the light for about thirty seconds provides about five minutes of light. Shaking the unit for 10 to 15 seconds every 2 or 3 minutes as necessary permits the device to be used continuously. Inside the flashlight, a sliding magnet moves back and forth inside a solenoid, or a spool of copper wire. Current is induced through the loops in the copper wire to create a current per Faraday's law of induction. This charges a capacitor, which essentially acts as a short-term battery.

Optionally, the visual effecter of the present invention further comprises an optical element, which is preferably also encapsulated with the electronic-optical element(s), to add more visual effects. Examples of the optical element include, but are not limited to, various passive optical elements, optical fiber, prism, lens, refracting lens, photonic crystals, reflector, reflecting mirror, optical waveguides, and the like, and the combination thereof. Examples of prism are dispersive prisms such as triangular prism, Abbe prism, Pellin-Broca prism, and Amici prism; reflective prisms such as Pentaprism, Porro prism, Porro-Abbe prism, Abbe-Koenig prism, Schmidt-Pechan prism, Dove prism, Dichroic prism, and Amici roof prism; and polarizing prisms made of a birefringent crystalline such as Nicol prism, Wollaston prism, Rochon prism, Glan-Foucault prism, Glan-Taylor prism, and Glan-Thompson prism. Optical waveguides can be classified according to their geometry (planar, strip, or fiber waveguides), mode structure (single-mode, multi-mode), refractive index distribution (step or gradient index) and material (glass, polymer, and semiconductor). A mirror can be a plane mirror with a flat surface; or curved mirror, to produce magnified or diminished images or focus light or simply distort the reflected image.

Optionally, the visual effecter of the present invention further comprises other light emitting materials or devices to add more visual effects, for example, light emission resulting from heat (incandescence), the action of chemicals (chemoluminescence), the action of sound (sonoluminescence), and mechanical action (mechanoluminescence).

To prepare the visual effecter, the electronic-optical element may be encapsulated together with other optional elements as described above using any known methods with any known encapsulating materials. Encapsulating materials may be selected from various known ceramics, glass, cements, granular solids, and powdered solids. Preferably, the encapsulating material is selected from known transparent materials such as thermosetting plastics (thermosets), epoxy, silicone, polyurethane, polyester, polysulfide, allylic resin, and the like, and the mixture thereof.

Thermosetting plastics (thermosets) are polymer materials that irreversibly cure to a stronger form. The cure may be done through heat, through a chemical reaction (two-part epoxy, for example), or irradiation such as electron beam or UV processing. Thermoset materials are usually liquid or malleable prior to curing and designed to be molded into their final form. The curing process transforms the resin into a plastic or rubber by a cross-linking process. Energy and/or catalysts are added that cause the molecular chains to react at chemically active sites (unsaturated or epoxy sites, for example), linking into a rigid, 3-D structure. The cross-linking process forms a molecule with a larger molecular weight, resulting in a material with a higher melting point. During the reaction, when the molecular weight has increased to a point so that the melting point is higher than the surrounding ambient temperature, the material forms into a solid material. For example, epoxy or polyepoxide is a thermosetting epoxide polymer that cures (polymerizes and crosslinks) when mixed with a catalyzing agent or "hardener". Most common epoxy resins are produced from a reaction between epichlorohydrin and bisphenol-A.

Silicones (polymerized siloxanes or polysiloxanes) are mixed inorganic-organic polymers with the chemical formula $[R_2SiO]_n$, where R can be organic groups such as methyl, ethyl, and phenyl. These materials consist of an inorganic silicon-oxygen backbone ( . . . —Si—O—Si—O—Si—O— . . . ) with organic side groups attached to the four-coordinate silicon atoms. In some cases, organic side groups can be used to link two or more of these —Si—O— backbones together. By varying the —Si—O— chain lengths, side groups, and crosslinking, silicones can be synthesized with a wide variety of properties and compositions. They can vary in consistency from liquid to gel to rubber to hard plastic. The most common siloxanes are linear polydimethylsiloxane (PDMS) as well as silicone resins which are formed by branched and cage-like oligosiloxanes.

Optionally, the encapsulant itself may be modified to add more visual effect(s) to the device of the invention, for example, the surface may be physically treated such as carving a pattern; or be painted with colors; or contains some pigments or colorant inside the body of the encapsulant.

Encapsulation can be completed based on many known technologies in the art, such as embedment, packaging, casting such as resin casting, potting, molding, and impregnation that coat, bury, encase, seal, envelope, and house one or more devices. In a preferred embodiment, reaction injection molding or RIM molding is used in the encapsulation process, which is similar to injection molding except that a reaction occurs within the mold. The process uses thermoset polymers (e.g. epoxy and polyurethane) instead of thermoplastic polymers used in standard injection molding. Before injection of the polymer two components are mixed which react in the mold to form a solid thermoset polymer. The bi-component fluid has a much lower viscosity than molten thermoplastic polymer. Reaction injection molding is often used for enclosures for electrical and computer equipment. Potting is a process of filling a complete electronic assembly with a solid compound for resistance to shock and vibration, and for exclusion of moisture and corrosive agents. Thermosetting plastics are often used in potting. In some embodiments, a conformal coating process may also be considered.

A 2-dimensional display that is subject to the visual effect rendered by the encapsulated visual effecter can be developed, printed, recorded, carved, or painted on or in any suitable medium. For example, the medium may be selected from glass, paper, metal, magnetic layer, stone, polymer, wood, and any combination thereof. In some embodiments, the display medium itself and the image/text on the medium are waterproof. For example, a waterproof ink or toner can be used to print the text and image on a waterproof medium.

Any known suitable methods may be used to join the display with the visual effecter, for example chemical bonding such as gluing and "soldering" together; mechanical bonding with any fastening means such as screwing and nailing; or any combination thereof. In some embodiments, the visual effecter and the display may be encased together with a transparent material such as PVC.

The present invention may be used in many commercial applications. For example, the displaying device of the invention may constitute a part or the entirety of a product selected from a souvenir such as a tourist souvenir (e.g. a key chain), a corporation souvenir, a decorative article, a photo frame, a logo, a design, a refrigerator magnet, an apparel decoration or accessory, a button decoration, a shoe decoration or accessory, a keepsake, a desktop article, a stationary decoration or accessory, a pen, a pencil, a gift, a memento, a general purpose sign, a commercial sign such as a "house for sale" sign, a promotional display, an indicia, a price tag, a product label, a scorecard for an athletic event, and the like, and any combination thereof.

Another aspect of the invention is to provide a method of making a displaying device comprising a visual effecter and a display, which comprises:

(i) encapsulating at least one electronic-optical element;
(ii) providing a visual effecter comprising the at least one electronic-optical element;
(iii) providing a 2-dimensional or 3-dimensional display; and
(iv) placing the display outside the visual effecter so as to make the display subject to the visual effect of the visual effecter.

The invention also provides a method of highlighting a 2-dimensional or 3-dimensional display, for example, the text and image on a 2-dimensional display, and making it visually attractive. The method includes placing the display outside the visual effecter as described above, so as to make the display subject to the visual effect of the visual effecter.

In preferred embodiments, the electronic-optical element is liquid crystal device; the display is a customized 2-dimensional display comprising an image, a text, or any combination thereof; and the displaying device is a key chain.

In various preferred embodiments, the steps of (i) encapsulating at least one electronic-optical element and (ii) providing a visual effecter comprising the at least one electronic-optical element are conducted industrially at a large scale. Thus the two steps (i) and (ii) can be geographically located so far away from the place where the step of (iv) placing the display outside the visual effecter so as to make the display subject to the visual effect of the visual effecter is performed, for example, at least 25 miles away, preferably at least 1000 miles away, and more preferably at least 6000 miles away. For example, steps (i) and (ii) can be performed in a developing country such as China, while steps (iii) and (iv) can be performed in developed countries, e.g. the U.S. and Europe.

In exemplary embodiments, step (iii) comprises providing a 2-dimensional display which comprises an image, a text, or any combination thereof, wherein both the display medium and text/image thereon are customized.

In some embodiments, steps (iii) and (iv) can be conducted with simple label maker or printing software combined with a regular printer, which can conveniently enable a retailer to make a customized souvenir immediately at the tourist site or gift shop.

The entire device of the invention can be, and is preferably, made waterproof, for example, a waterproof visual effecter is combined with a waterproof display with any waterproof glue. A 2-dimensional display may include text and image formed with waterproof ink or toner on waterproof medium. Alternatively, the visual effecter and the display may be made waterproof by joining them or encasing them together chemically and/or mechanically (e.g. using a lid or magnet to fix and cover the display on the rear face of the visual effecter).

EXAMPLE 1

Model P001SC and P003SC solar cells, model P001IC LCD Flashing integrated circuits (IC), and model P001LCD and P003LCD twisted nematic (TN) displays were all commercially purchased from SOLARGIFTS ELECTRONIC CO., LTD located at: A, Block 2, 2nd District, Industrial Garden of Shenzhen Cereals Group, Songyuan, Guanlan, Shenzhen, Guangdong Province 518100, China. Two-component epoxy resin DC-2501R LV and Hardener DC-919C RT were purchased from Epoxies, Etc. . . . (21 Starline Way, Cranston, R.I. 02921, USA). All the devices and materials were used "as is" and used according to the manufacturer's product instruction.

With reference to FIG. 1, the visual effecter 66 for a key chain was prepared and tested. One P001SC solar cell 16, one P001IC LCD Flashing integrated circuit (IC) 18, and one P001LCD twisted nematic (TN) display 88 which was cut into a rectangular shape were electrically connected by copper wire (not shown), and then placed into a mold that gives the shape as desired for visual effecter 66. The bottom of the mold can be so designed that a rectangular groove is formed on the back side of the visual effecter 66 for the future housing of, and joining with, a display. The P001SC solar cell 16 and LCD Flashing IC 18 were placed in the visual effecter 66 where they are as unnoticed as possible; for example, place them in the peripheral region of the mold. The epoxy resin components were mixed slowly for about 4-5 minutes to make sure no bubbles were formed in the resin. The resin may be prepared at a temperature of above 75° F. (Fahrenheit), such as 85° F. The resin was then poured into the mold to immerse the solar cell 16, the flashing IC 18, the twisted nematic (TN) display 88, and metal wires. Such encapsulated visual effecter 66 was then placed in a dry room for 20-24 hours to cure or harden the epoxy resin.

Figure 2:
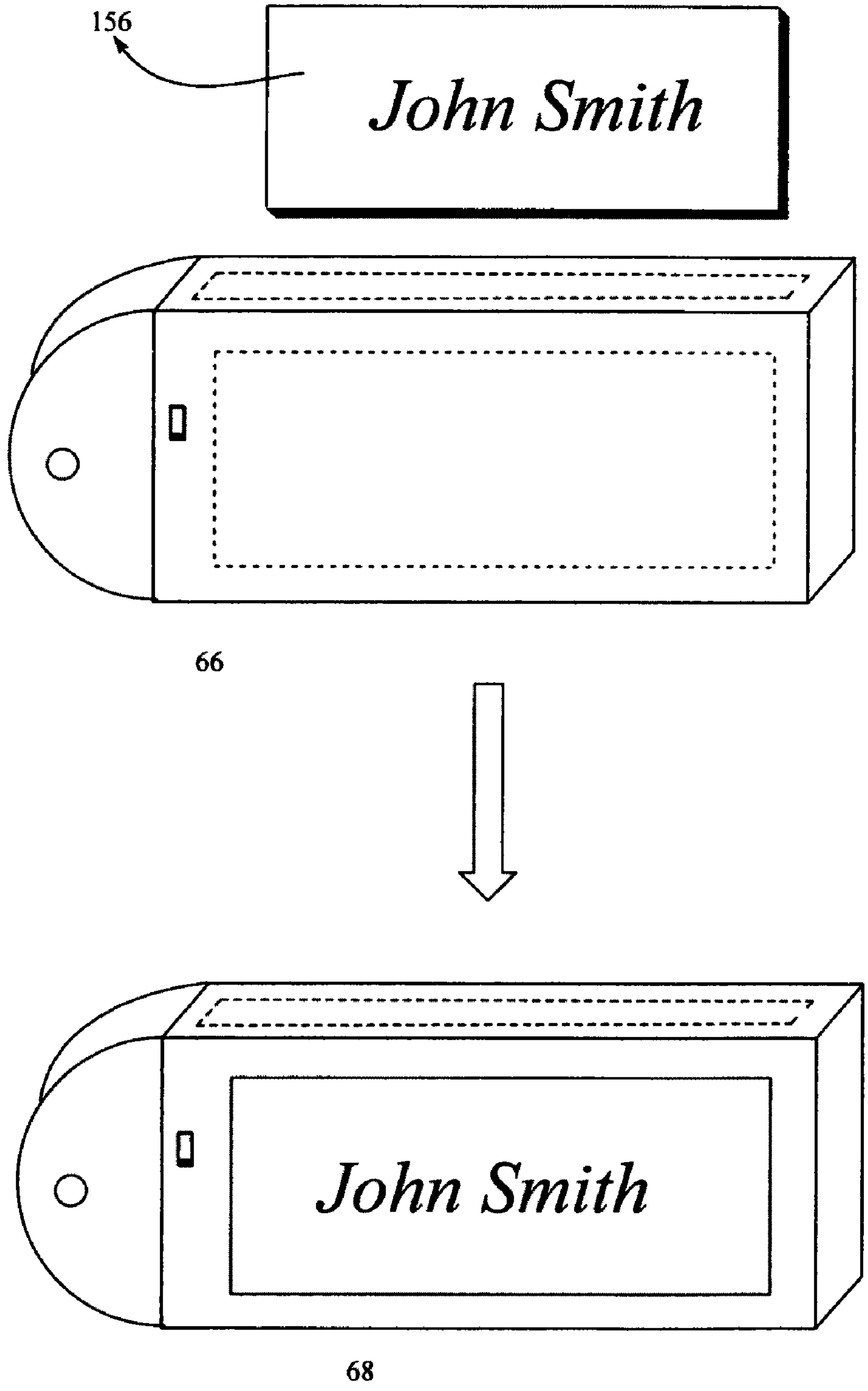
FIG. 2 illustrates a step in making a displaying device in which a visual effecter and a customized display are chemically joined (e.g. gluing) together in an embodiment of the invention.

With reference to FIG. 2, a customized 2-dimensional display 156 was glued on the back of the visual effecter 66, right behind the position where the twisted nematic (TN) display 88 locates. A displaying device such as a key chain 68 was formed. The key chain 68 was made waterproof. In the absence of light, key chain 68 was not blinking or flashing.

Figure 3:
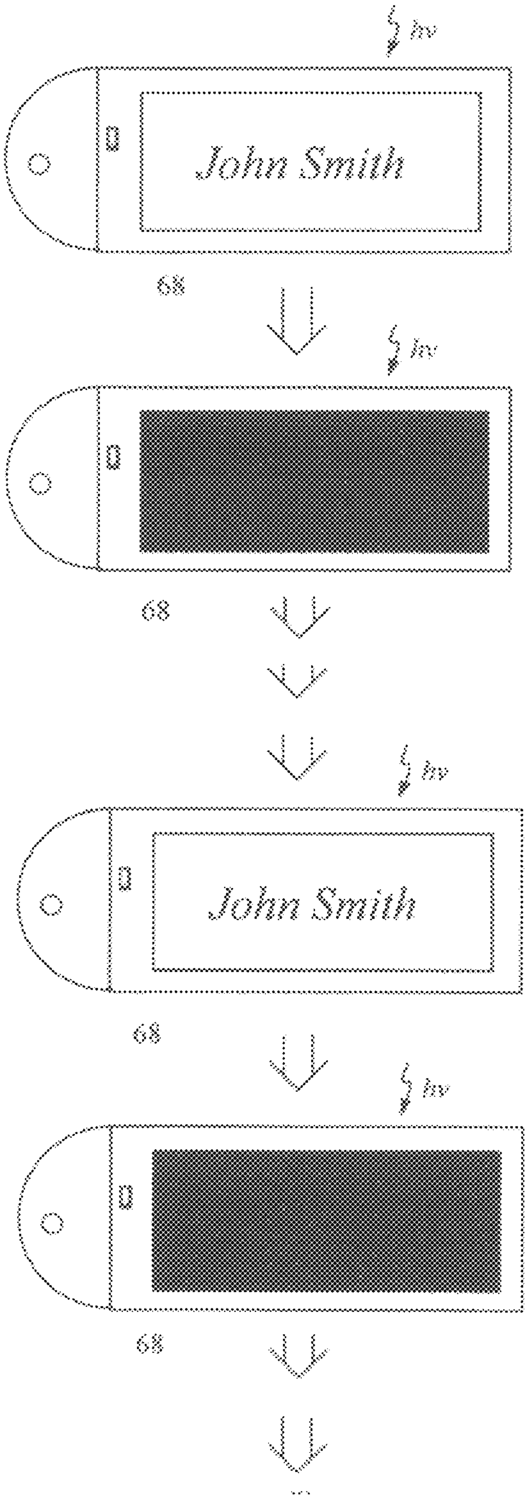
FIG. 3 demonstrates the "blinking" visual effect of a displaying device under light such as sunlight irradiation in an embodiment of the invention.

With reference to FIG. 3, when key chain 68 was under light (photon hv) such as sunlight, the transparency of twisted nematic (TN) display 88 began to vary, which gives a visual effect that customized display 156 ("John Smith") behind visual effecter 66 is blinking or flashing.

EXAMPLE 2

Figure 4:
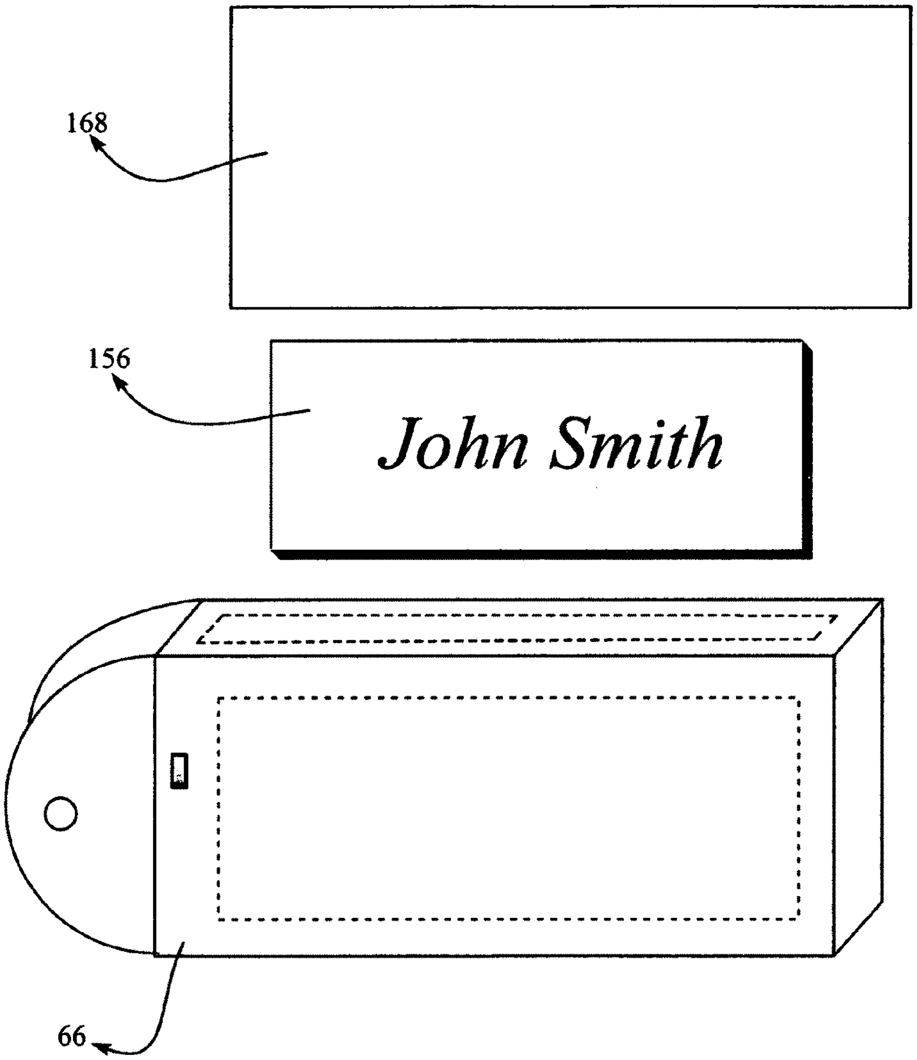
FIG. 4 shows the configuration of a displaying device including a display sandwiched between a magnet and a visual effecter in an embodiment of the invention.

The devices, materials, and procedure were the same as Example 1, except that a magnet "sheet" 168 (may also function as a back lid or cover) was used to fasten and join the display 156 with the visual effecter 66, as shown in FIG. 4. The display 156 was sandwiched between the magnet 168 and the visual effecter 66. Any known methods may be used to fasten the three parts together. The key chain 68 was made waterproof. The magnet 168 was decorated with a feature text and image, such as the text "Florida" appearing on a beach image.

EXAMPLE 3

The devices, materials, and procedure were the same as Example 1, except that the display 156 and the visual effecter 66 were encased in a PVS box or bag. Any known methods may be used to prepare such an encased key chain 68. The key chain 68 was made waterproof.

EXAMPLE 4

The devices, materials, and procedure are the same as Example 2, except that the magnet 168, the display 156, and the visual effecter 66 are encased in a PVS box or bag. Any known methods may be used to prepare such an encased key chain 68. The key chain 68 can be made waterproof too.

EXAMPLES 5-8

Examples 1-4 were repeated, except that all P001SC solar cells were replaced by P003SC solar cells, and model P001 LCD twisted nematic (TN) displays were replaced with and P003LCD TN displays.

All the examples have demonstrated that the products and their preparation exhibit numerous merits such as easy manufacturability, lower failure rate, improved cost-effectiveness, production efficiency, easy handling, timely and speedy supply, and better product reliability and stability, among others.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of making a displaying device comprising a visual effecter and a display, which comprises:

(i) immersing an electronic-optical element, a power supply, and an electronic element in a liquid material;

(ii) hardening the liquid material to form a visual effecter;

(iii) providing a 2-dimensional or 3-dimensional display; and (iv) placing the display outside the visual effecter so as to make the display subject to the visual effect of the visual effecter.

2. The method of according to claim 1, in which the electronic-optical element is liquid crystal device; the display is customized; and the displaying device is a key chain.

3. The method according to claim 1, in which the power supply is a photovoltaic cell.

4. The method according to claim 1, in which the hardened material is selected from glass, epoxy, silicone, polyurethane, polyester, polysulfide, allylic resin, and any combination thereof.

5. The method according to claim 1, in which the display is a 2-dimensional display comprising an image, a text, or any combination thereof; and the medium for the display is selected from glass, paper, metal, magnetic layer, stone, polymer, and wood.

6. The method according to claim 1, in which the display is customized and is waterproof.

7. The method according to claim 1, further comprising a step of joining the display with the visual effecter by chemical bonding, mechanical bonding, or any combination thereof.

8. The method according to claim 1, further comprising a step of encasing the visual effecter and the display together within a transparent material.

9. The method according to claim 1, in which the displaying device is a tourist souvenir.

10. The method according to claim 1, in which the electronic element is an integrated circuit (IC).

11. The method according to claim 10, in which the integrated circuit is a flashing IC.

12. The method according to claim 1, in which the electronic-optical element is selected from a liquid crystal device.

13. The method according to claim 12, in which the liquid crystal device is a TN display.

* * * * *